United States Patent [15] 3,706,950
Stephan et al. [45] Dec. 19, 1972

[54] PROTEIN ADHESIVE COMPOSITIONS

[72] Inventors: John T. Stephan, Longview; A. J. Golick, Seattle, both of Wash.

[73] Assignee: Commercial Solvents Corporation, New York County, N.Y.

[22] Filed: Jan. 18, 1971

[21] Appl. No.: 107,434

Related U.S. Application Data

[62] Division of Ser. No. 815,197, April 10, 1969, Pat. No. 3,640,740.

[52] U.S. Cl. ..................156/336, 156/310, 156/317, 161/188, 161/270
[51] Int. Cl. ........B32b 21/00, B32b 29/00, C09j 3/18
[58] Field of Search ......161/270, 188; 156/336, 328, 156/317, 307, 310; 106/138, 146

[56] References Cited

UNITED STATES PATENTS

| | | | |
|---|---|---|---|
| 1,950,651 | 3/1934 | Behnke | 156/336 |
| 1,976,436 | 10/1934 | Cone | 156/336 X |
| 2,044,466 | 6/1936 | Cleveland et al. | 156/336 X |
| 2,291,586 | 7/1942 | Galber et al. | 156/336 |
| 3,436,300 | 4/1969 | Bryner | 156/336 X |

*Primary Examiner*—Harold Ansher
*Attorney*—Howard E. Post et al.

[57] ABSTRACT

An adhesive composition having particular utility for the manufacture of laminated cellulosic products wherein one component is an aqueous alkali-dispersed protein and the other component is an oxazolidine, e.g. (5-hydroxymethyl-1-aza-3,7-dioxabicyclo[3,3,0]octane).

1 Claim, No Drawings

PROTEIN ADHESIVE COMPOSITIONS

CROSS REFERENCE TO RELATED APPLICATIONS

This application is a division of application Ser. No. 815,197, filed Apr. 10, 1969, now U.S. Pat. No. 3,640,740.

BACKGROUND OF THE INVENTION

This invention relates to protein adhesive compositions. In a particular aspect it relates to alkali-dispersed protein-oxazolidine combinations for the manufacture of laminated cellulosic products.

The use of adhesives to prepare laminated cellulosic products, e.g., plywood or paper products, is an old, well-known process and many different adhesives have been suggested. Presently, alkaline-dispersed protein adhesives and low temperature-curing phenol- and resorcinol-formaldehyde resins are in widespread use.

Soybean protein in an aqueous, alkaline dispersion, has long been in use as an adhesive for the manufacture of plywood, but it does not have the water resistance that has characterized the more recently employed hot press phenol-formaldehyde resin adhesives. Blood protein is in widespread use, but supplies are limited and it is comparatively high priced. Blood has the advantage over soybean protein in that its aqueous solutions are inherently thermosetting at temperatures above about 160° F. This enables the formulation of alkaline aqueous adhesive solutions which gel upon the application of heat. Such adhesives cure rapidly at elevated temperatures and have excellent water resistance. On the contrary, casein or soybean protein is thermoplastic and alkaline aqueous adhesives based on these materials set by a simple drying out procedure and/or chemical reaction. Such solutions do not ordinarily gel on one application of heat.

A need therefore exists for upgrading soybean and casein-based protein adhesives to perform a thermosetting function comparable with blood protein or thermosetting synthetic resin adhesives.

SUMMARY OF THE INVENTION

It is an object of this invention to provide an improved process for laminating cellulosic articles.

Another object of this invention is to provide adhesives having a satisfactory working life.

Other objects will be apparent to those skilled in the art from the disclosure herein.

It has been discovered that an adhesive composition comprising a combination of an alkaline-dispersed protein and an oxazolidine represented by the formula:

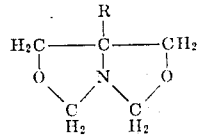

wherein R is ethyl or hydroxymethyl possesses the rapid setting and water resistance of protein adhesives. When R is ethyl, the oxazolidine is 5-ethyl-1-aza-3,7-dioxabicyclo[3,3,0]octane, which hereinafter will be referred to as oxazolidine E; when R is hydroxymethyl, the oxazolidine is 5-hydroxymethyl-1-aza-3,7-dioxabicyclo[3,3,0]octane, which hereinafter will be referred to as oxazolidine T.

DETAILED DISCUSSION

The proportion of protein to oxazolidine in the composition of the present invention is not critical. Preferably, however, they are present in a ratio of about 3 to about 20 parts of protein (dry basis) to 1 part by weight of oxazolidine. Generally a high proportion of protein leads to longer working time. The bicyclic oxazolidines used in the adhesives of the present invention may be prepared according to the method of Murray Senkus, J. M. Chem. Soc. 67, 1515–1519(945) or that of William B. Johnston, U. S. Pat. No. 2,448,890. Generally these compounds are made by the reaction of 2 moles of formaldehyde with 1 mole of 2-amino-2-hydroxymethyl-1,3-propanediol (T), or 2-amino-2-ethyl-1,3-propanediol (E). Other oxazolidines are known in the art but generally they are less satisfactory than the oxazolidines of the present invention.

The protein employed in the practice of this invention can be any of the proteins known to those skilled in the art. Generally, however, blood protein, although otherwise suitable, is satisfactory for use without the oxazolidines of the present invention. Other commonly used proteins suitable for the practice of the invention include, but are not limited to casein and soybean protein. The alkaline material and the amount used to effect protein dispersions is known in the art and the prior art practice is suitable for the practice of this invention. As is generally recognized, a high proportion of alkaline material with respect to the protein can have a degradation effect which can render the protein non-gelling and ineffective as an adhesive. Accordingly, only sufficient alkaline material to effect the protein dispersion should be employed, as is known in the art.

The adhesive combination of this invention is especially suitable for use in manufacturing laminated cellulosic articles, such as laminated timbers, plywood and paper articles, particularly by the separate application process described in U.S. Pat. No. 2,015,806. In this process one component is applied to one surface and the second component is applied to the other surface. The two surfaces are joined, pressure is applied, and the components react to form a powerful bond. It is also suitable to premix the two components and apply the mixture to the surfaces to be joined. However, the high reactivity of the two components may only permit a short working time.

In assembling materials to be laminated, it is customary to subject them to bonding pressure in a suitable press, which can be operated at ambient temperatures, or heated to the desired temperature, e.g., to as high as 300°–350°F. The amount of pressure can be varied, but generally the pressures used in the art are suitable, e.g., pressures of the order of 100–200 psi. Pressure generally is employed to secure a good bond through intimate contact of surfaces.

The components of the adhesives of the present invention react readily at ambient temperature, e.g. from about 68°F to about 110°F, so the application of heat is not required. Elevated temperatures promote more rapid setting, however, and can be used after assembly of the article when high-speed reactivity is desired. Temperatures generally in the range of from about 110°F to about 350°F are suitable.

The above invention can be better understood by reference to the following examples. However, these examples are only for the purpose of illustration and it is not intended that the invention be limited thereby.

EXAMPLE 1

An alkaline aqueous dispersion of protein was prepared by mixing 50 g of casein (80 mesh, Argentine lactic grade) with 100 ml of water and 5 g of 50% sodium hydroxide solution. The casein solution thereby obtained was a typically fluid, tacky material. The solution was divided into 2 portions. To one portion 5 percent by weight of oxazolidine "E" was added, and to the other 5 percent of "T." With "E," gelation of the protein occurred in about 5 minutes, and with "T" gelation occurred in about 20 minutes. When a freshly mixed sample of the casein solution with 5 percent "T" was heated, gelation occurred promptly when the temperature reached about 140°F.

EXAMPLE 2

This experiment was performed to demonstrate the reactivity between the oxazolidine "T" and soybean protein. In this series of experiments, 5 layers of fir veneer, one-eighth inch, were assembled to form a laminate. The soybean protein dispersion was prepared from commercial soybean protein, 400 g, and dispersed in 1600 g of water with 50 percent sodium hydroxide solution, 57 g. The soybean protein dispersion was then mixed with 1 percent by weight of oxazolidine "T" to give a proportion of protein to "T" of about 20:1 and applied to the veneer layers at about 50 lbs./1,000 sq. ft. of single glue line.

In two experiments the assembly times were 10 minutes and 20 minutes respectively and each assembled laminate was heated at 300°F in a hot press for 6 minutes. The dry bond in each case was normal as compared with controls in which soybean protein alone was used. In a third experiment the assembled laminate was compressed in a cold press for 15 minutes at 150 psi pressure which resulted in a normal dry bond.

EXAMPLE 3

A dispersion was prepared by mixing 100 g of a commercial soybean flour with 400 g of water (70°F) and 11.4 g sodium hydroxide. Five g oxazolidine "T" per 100 g of the wet adhesive mix was added to provide a ratio of about 4:1 of protein to "T," and the fluid mixture was heated in a water bath. A firm gel developed when the adhesive temperature reached between about 168°F and 175°F. In the absence of "T," no gel developed on heating to 175°F or after holding at 212°F, for extended periods.

The above experiment was repeated except that 10 percent sodium silicate (wet glue basis) was mixed with the soybean protein. Then 1 percent of "T" dissolved in water was added to the mixture to provide a ratio of about 20:1. A firm gel was produced when the mixture was heated to 180°F to 190°F. This demonstrates the pH buffering effect of sodium silicate. In another experimental variation, 3.8 g sodium hydroxide per 100 g soybean flour and 400 g water was mixed and to 100 g of this wet mix, 1 g of "T" was added to provide a ratio of about 20:1 of protein to "T". This fluid mix produced a gel at 175°–185°F. When the concentration of "T" was increased to 5 g, (i.e., 4:1 of protein to "T"), a gel was obtained at 150°F.

EXAMPLE 4

The following experiment was conducted with a soybean flour dispersion prepared as follows:

| | |
|---|---|
| soybean flour | 400 g |
| water | 1680 g |
| NaOH (50% solution) | 122 g |
| Total | 2202 g |

The above colloidal mixture had a ratio of 15 g of NaOH solid per 100 g of soybean flour.

An aliquot of 100 g of the solution was mixed with 5 ml of oxazolidine "E" (5.35 g), to give a ratio of protein to "E" of about 3.4:1 and a second aliquot of 100 g was mixed with 5 g of oxazolidine "T" to give a ratio of about 3.6:1.

The solution containing "E" gelled in 15 minutes at 70°F. The solution containing "T" gelled within 2¼ hours at room temperature, but did not gel when heated to 210°F. This indicates that gelatinization temperature can be controlled by adjusting the ratio of caustic soda to soybean flour, as well as the quantity of oxazolidine.

EXAMPLE 5

An alkaline soybean dispersion was prepared in accordance with Example 4 except that only 55 g of 50 percent aqueous sodium hydroxide solution was employed, giving a final concentration of 6.7 g NaOH per 100 g of soybean flour.

To a 100 g aliquot of the above aqueous mixture was added 5 g of oxazolidine "T" to give a ratio of 3.7:1. One sample of this solution gelled at 150°F and another gelled in 1¾ hours at room temperature.

A typical corrugated paper laminate was prepared using the above mixture containing "T" at a press time of 20 seconds at 300°F. The resulting laminate exhibited 100 percent bond even after a 6-hour soak in water.

We claim:

1. In a process for joining two surfaces of at least two cellulosic articles by applying an alkaline casein or soybean protein solution to one surface and a second component capable of forming an adhesive with said protein, the improvement consisting of applying as said second component an oxazolidine of the group represented by the formula

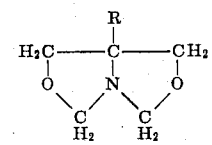

wherein R is ethyl or hydroxymethyl.

* * * * *

PO-1050
(5/69)

UNITED STATES PATENT OFFICE
CERTIFICATE OF CORRECTION

Patent No. 3,706,950          Dated December 19, 1972

Inventor(s) John T. Stephan and A. J. Golick

It is certified that error appears in the above-identified patent and that said Letters Patent are hereby corrected as shown below:

Column 2, line 12 "945" should be --1945--

Signed and sealed this 17th day of April 1973.

(SEAL)
Attest:

EDWARD M. FLETCHER, JR.                      ROBERT GOTTSCHALK
Attesting Officer                              Commissioner of Patents